(12) United States Patent
Desrues

(10) Patent No.: US 10,549,300 B2
(45) Date of Patent: Feb. 4, 2020

(54) HEAD AND METHOD FOR MOUNTING A DISPENSING MEMBER ON THE NECK OF A CONTAINER

(71) Applicant: APTAR FRANCE SAS, Le Neubourg (FR)

(72) Inventor: Stephane Desrues, Poses (FR)

(73) Assignee: APTAR FRANCE SAS, Le Neubourg (FR)

( * ) Notice: Subject to any disclaimer, the term of this patent is extended or adjusted under 35 U.S.C. 154(b) by 769 days.

(21) Appl. No.: 14/890,478

(22) PCT Filed: Jun. 17, 2014

(86) PCT No.: PCT/FR2014/051497
§ 371 (c)(1),
(2) Date: Nov. 11, 2015

(87) PCT Pub. No.: WO2014/202893
PCT Pub. Date: Dec. 24, 2014

(65) Prior Publication Data
US 2016/0074890 A1    Mar. 17, 2016

(30) Foreign Application Priority Data
Jun. 21, 2013 (FR) ..................................... 13 55915

(51) Int. Cl.
*B05B 11/00* (2006.01)
*F16L 25/00* (2006.01)

(52) U.S. Cl.
CPC .... *B05B 11/3047* (2013.01); *B05B 11/00416* (2018.08); *F16L 25/0018* (2013.01)

(58) Field of Classification Search
CPC ............. B05B 11/3047; B05B 11/0048; F16L 25/0018; B67B 3/22; B67B 2201/12
See application file for complete search history.

(56) References Cited

U.S. PATENT DOCUMENTS

| | | | |
|---|---|---|---|
| 3,616,513 A | 11/1971 | Dimond | |
| 3,708,854 A | 1/1973 | Nalbach | |
| | | (Continued) | |

FOREIGN PATENT DOCUMENTS

| | | | |
|---|---|---|---|
| EP | 0 509 179 A1 | 10/1992 | |
| EP | 0 690 020 A1 | 1/1996 | |
| | (Continued) | | |

OTHER PUBLICATIONS

International Search Report for PCT/FR2014/051497 dated Oct. 8, 2014 [PCT/ISA/210].

(Continued)

*Primary Examiner* — James M Hewitt, II
(74) *Attorney, Agent, or Firm* — Sughrue Mion, PLLC

(57) ABSTRACT

A mounting head (T) for mounting a pump or a valve on a neck (22) of a reservoir (2), the mounting head (T) having a mounting member (3) for imparting an axial mounting movement from an axial arrangement placed on the neck (22). The mounting member (3) has a centering mechanism (35, 36, 4) bringing the dispenser member (1) into an axial arrangement on the neck (22) if offset. The mounting head (3) has mounting tabs (31) movable axially so as to bring the dispenser member (1) from the axial arrangement towards the final position, and movable radially inwards so as to return the dispenser member (1) into an axial arrangement. An outer clamping collar (4) simultaneously moves the mounting tabs (31) radially inwards from a spaced-apart rest position.

8 Claims, 2 Drawing Sheets

(56) References Cited

U.S. PATENT DOCUMENTS

| | | | |
|---|---|---|---|
| 3,986,323 A | 10/1976 | Aidlin et al. | |
| 6,044,626 A | 4/2000 | Harper et al. | |
| 8,413,853 B2* | 4/2013 | Behar | B65D 83/38 |
| | | | 215/274 |
| 8,534,509 B2* | 9/2013 | Duquet | B65D 47/2068 |
| | | | 222/212 |
| 8,684,615 B2* | 4/2014 | Lecoutre | A45D 40/267 |
| | | | 132/218 |
| 8,844,770 B2* | 9/2014 | Jourdin | B05B 11/3049 |
| | | | 215/274 |
| 9,289,788 B2* | 3/2016 | Beranger | B05B 11/048 |

FOREIGN PATENT DOCUMENTS

| | | |
|---|---|---|
| EP | 1 886 968 A1 | 2/2008 |
| FR | 2 843 709 A1 | 2/2004 |
| FR | 2 855 505 A1 | 12/2004 |

OTHER PUBLICATIONS

International Preliminary Examination Report for PCT/FR2014/051497 dated Aug. 26, 2015 [PCT/IPEA/409].

International Preliminary Report on Patentability dated Dec. 23, 2015 from the International Bureau in counterpart International Application No. PCT/FR2014/051497.

\* cited by examiner

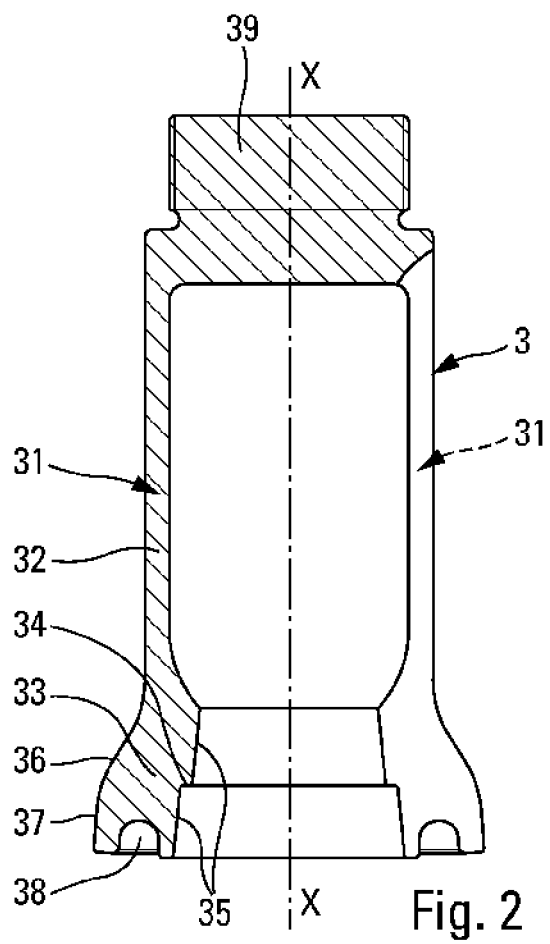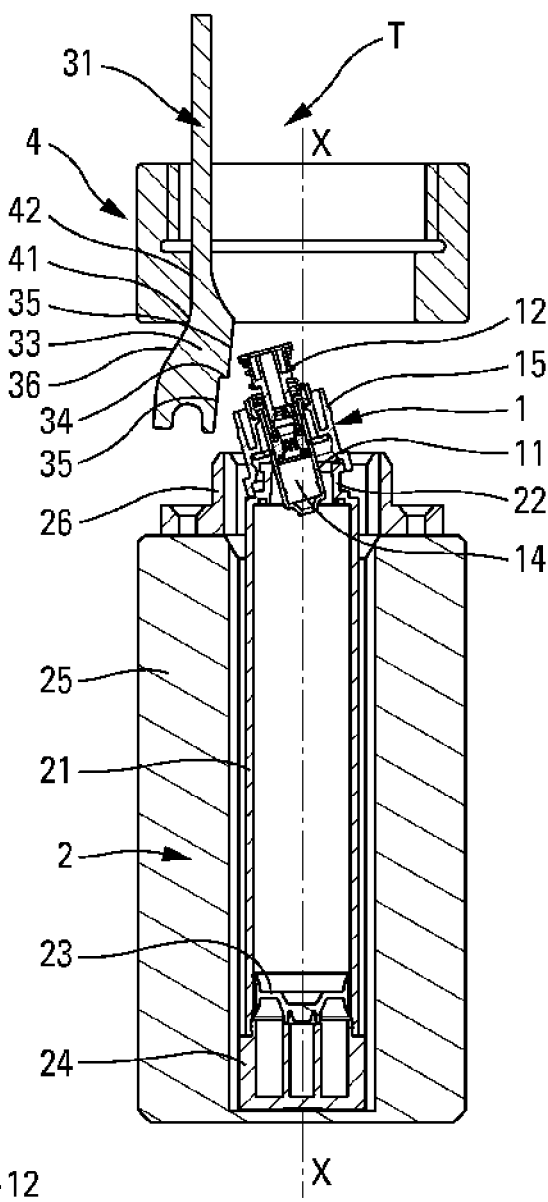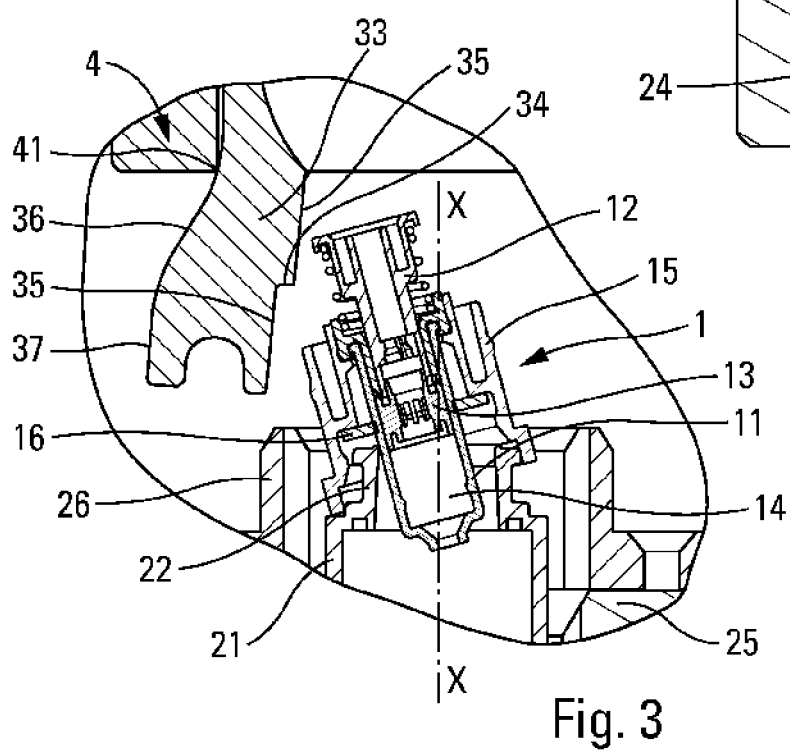

HEAD AND METHOD FOR MOUNTING A DISPENSING MEMBER ON THE NECK OF A CONTAINER

CROSS REFERENCE TO RELATED APPLICATIONS

This application is a National Stage of International Application No. PCT/FR2014/051497 filed Jun. 17, 2014, claiming priority based on French Patent Application No. 1355915 filed Jun. 21, 2013, the contents of all of which are incorporated herein by reference in their entirety.

FIELD OF INVENTION

The present invention relates to a mounting head and method for mounting a dispenser member, such as a pump or a valve, on a neck of a fluid reservoir so as to constitute a fluid dispenser. The mounting head comprises a mounting member for imparting an axial mounting movement to the dispenser member, which movement brings it from an axial arrangement placed on the neck into a leaktight final mounted position on the neck. The present invention thus applies to the field of mounting tools or stations, more particularly in the fields of perfumery, cosmetics, and pharmacy.

BACKGROUND

Specifically, in order to constitute a fluid dispenser, it is necessary to mount the dispenser member (pump or valve) in stationary and leaktight manner on the neck of a reservoir that may be pre-filled with fluid. In general, the dispenser member is provided with a mounting ring that comes into stationary and leaktight engagement with the outside, or even the inside, of the neck of the reservoir. The most widespread fastener techniques for mounting the fastener ring on the neck of the reservoir are snap-fastening and screw-fastening, both requiring an axial mounting movement to be imparted downwards on the fastener ring.

It has been known for a long time to use a mounting head that is moved axially in order to impart the axial mounting movement to the dispenser member, and more particularly to its fastener ring, which movement brings it from an axial arrangement in which it is merely placed on the neck into a final mounted position on the neck. Specifically, before arriving at the mounting station equipped with the mounting head of the invention, the dispenser member is merely placed on the neck at a prior station. Naturally, it is desired to place the dispenser member in accurately axial manner on the neck, so that the mounting head can come into engagement correctly with the dispenser member in order to impart the axial mounting movement thereto. However, it can frequently happen that the dispenser member is placed in an offset manner, i.e. sloping relative to the vertical axis. It can also happen that the dispenser member is placed in axial or upright manner, but that it becomes offset or sloping while being transferred from the placing station to the mounting station. Under such circumstances, while the mounting head is being moved downwards, it cannot come into engagement correctly with the dispenser member, which may then be damaged or mounted in non-leaktight manner on the neck.

In the prior art, document EP 1 886 968 is known, which describes a mounting head for gripping a cap so as to make it possible to turn it in order to screw-fasten it on a threaded receptacle neck. The head forms arms that are constrained in their rest position by two outer resilient rings, such that the inside diameter of the arms is smaller than the outside diameter of the cap. Thus, the arms cannot perform a function of axial centering.

Certain Objects of Invention

An object of the present invention is to remedy the above-mentioned drawback of the prior art by guaranteeing that the dispenser member is always arranged in accurately axial manner when the mounting head imparts the axial mounting movement thereto that brings it into its leaktight final mounted position. Another object of the present invention is to guarantee the dispenser member is arranged axially without requiring an intermediate mounting station between the dispenser member being put into place and then being mounted.

To achieve these objects, the present invention proposes a mounting head for mounting a dispenser member, such as a pump or a valve, on a neck of a fluid reservoir so as to constitute a fluid dispenser, the mounting head comprising a mounting member for imparting an axial mounting movement to the dispenser member, which movement brings it from an axial arrangement placed on the neck into a leaktight final mounted position on the neck, the mounting member incorporating axial centering means for bringing the dispenser member into an axial arrangement on the neck of the reservoir if it has been placed in an offset manner on the neck; the mounting head comprising a plurality of mounting tabs that are movable axially so as to bring the dispenser member from the axial arrangement towards the final position, and that are movable radially inwards so as to return the dispenser member into an axial arrangement if it has been placed in an offset manner on the neck, the mounting head further comprising an outer clamping collar for simultaneously moving the mounting tabs radially inwards from a spaced-apart rest position.

Thus, the operation of straightening up the dispenser member axially is performed by the mounting head, such that it is not necessary to provide an intermediate station. The mounting member presents a certain similarity to crimping heads that are commonly used to deform a crimping cap radially inwards. However, in the context of the present invention, the radially-inward movement of the tabs is used to straighten up the dispenser member axially, and the axial movement is used for leaktight mounting on the neck, whereas for a crimping head, the axially-inward movement is used for stationary and leaktight mounting, and the axial movement has no particular function, except to bring the crimping head to the cap for crimping. The originality of the present invention thus resides in reconfiguring a conventional crimping head so as to impart different functions to its radial and axial movements.

Advantageously, each mounting tab includes an axial bearing profile that is suitable for coming into axial engagement with the dispenser member so as to move it axially from its axial arrangement towards its final position, and a radial thrust wall that is suitable for thrusting the dispenser member into an axial arrangement if it has been placed in an offset manner on the neck. Whether the fastener ring is a ring for snap-fastening or for screw-fastening, it is necessary to impart axial thrust, so as to bring it into its leaktight final mounted position.

Advantageously, each of the mounting tabs includes an outer cam surface that flares downwards and outwards, the outer clamping collar being axially movable downwards relative to the mounting tabs so as to come into engagement with the outer cam surfaces so as to clamp the mounting tabs. The outer clamping collar is a conventional element for a crimping head.

In a practical embodiment, the mounting tabs may be connected together at a common fastener stub. Advantageously, the mounting tabs are elastically deformable so as to be radially movable. The mounting member may thus be in the form of a bushing that is made up of mounting tabs that are arranged circumferentially beside one another, and that are connected together at their top ends by a common fastener stub. The free ends of the mounting tabs come into contact with the dispenser member so as to return it into an axial arrangement and into its leaktight final mounted position.

The invention also defines a mounting method for mounting a dispenser member, such as a pump or a valve, on a neck of a fluid reservoir so as to constitute a fluid dispenser, the mounting method, using a single mounting head comprising a mounting member that defines a plurality of mounting tabs, and comprising:

moving the mounting tabs radially inwards so as to return the dispenser member into an axial arrangement if it has been placed in an offset manner on the neck; then
moving the mounting tabs axially downwards so as to bring the dispenser member from the axial arrangement towards the leaktight final mounted position.

The spirit of the present invention resides in using a single mounting head both for returning the dispenser member into an axial arrangement if it has been placed in an offset manner on the neck, and for mounting the dispenser member in stationary and leaktight manner in its final position on the neck of the reservoir. Functionally converting a conventional crimping head in order to impart novel functions thereto, constitutes an original feature of the present invention. In particular, the mounting head of the invention may be used in a small chamber designed for crimping under a vacuum.

BRIEF DESCRIPTION OF FIGURES

The invention is described more fully below with reference to the accompanying drawings, which show an embodiment of the invention by way of non-limiting example.

In the figures:

FIG. 1 is a vertical section view through a fluid dispenser and a mounting head of the invention, in a sloping initial placement position;

FIG. 2 is a larger-scale vertical section view through the mounting member of the mounting head of the invention;

FIG. 3 is a greatly enlarged view of an advantageous detail of FIG. 1;

DETAILED DESCRIPTION OF NON-LIMITING EMBODIMENTS

Figure 4:
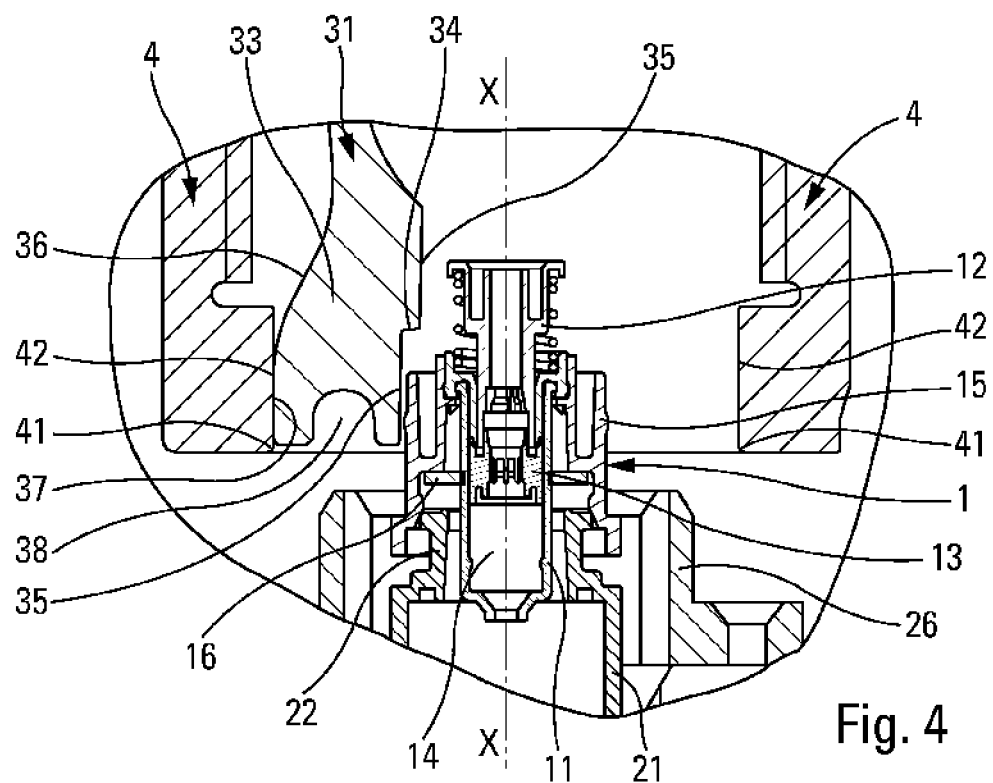
FIG. 4 is a view similar to the view in FIG. 3 after the dispenser member has been straightened up axially by the mounting head of the invention.
Figure 5:
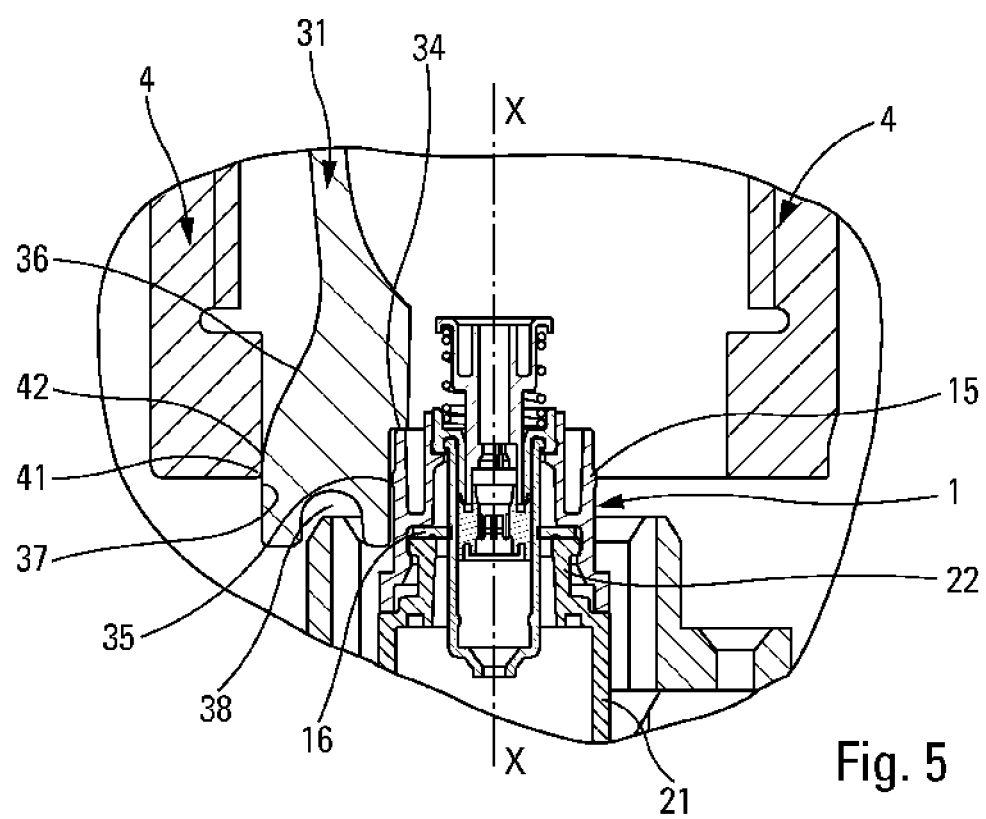
FIG. 5 is a view similar to the views in FIGS. 3 and 4 with the dispenser member in its leaktight final mounted position.

The mounting head of the invention, designated overall by the reference T, has the function of mounting a dispenser member 1, such as a pump or a valve, in stationary and leaktight manner on the neck of a fluid reservoir 2, so as to constitute together a fluid dispenser. The structure of the fluid dispenser, which is not critical to the present invention, is described in detail first.

As mentioned above, the dispenser comprises a dispenser member 1, which is a pump in the embodiment shown in the figures. In conventional manner, the pump 1 comprises a pump body 11 in which there is engaged in axially slidable manner, an actuator rod 12 that is provided with a piston 13 that slides in leaktight manner inside the body. A pump chamber 14 is thus defined inside the body 11, and its volume varies with the movement of the piston 13. The pump 1 also includes a fastener ring 15 that is fitted with a neck gasket 16 for procuring strong and leaktight fastening on the reservoir 2.

In the non-limiting embodiment in the figures, the reservoir 2 includes a slide cylinder 21 that defines a neck 22 at its top end. A follower piston 23 is engaged to slide in leaktight manner inside the cylinder 21, the follower piston 23 moving towards the pump 1 as the fluid is removed from the cylinder 21. The cylinder 21 also includes a fitted bottom wall 24 against which the follower piston 23 is positioned when the reservoir is full. Optionally, the reservoir 2 includes a cover 25 that surrounds the cylinder 21 and the fitted bottom wall 24, and that defines a skirt 26 at its top end surrounding the neck 22 of the cylinder 21 in coaxial manner. This is one particular design for a fluid reservoir. Naturally, other types of reservoir could be used without going beyond the ambit of the invention.

In the embodiment used to illustrate the present invention, the fastener ring 15 is snap-fastened axially on the neck 11. This causes the neck gasket 16 to be compressed on the top edge of the neck 11. In a variant that is not shown, the fastener ring 15 may be a screw-fastener ring. In this configuration, the neck 22 should be provided with an outside thread for co-operating with an inside thread (tapping) of the fastener ring. Whether the fastener ring 15 is of the snap-fastener or screw-fastener type, it is necessary to impart downward axial mounting movement, so as to bring the fastener ring into its leaktight final mounted position on the neck. For snap-fastening, the axial mounting movement is merely in the form of downward axial thrust, and for screw-fastening, the axial mounting movement is a combined movement comprising axial thrust associated with turning.

The pump 1 and the reservoir 2 may be circularly symmetrical about an axis X. The actuator rod 12 together with its piston 13 move axially along the axis X, as does the follower piston 23. In order to mount the pump 1 on the neck 22 of the reservoir, the axial mounting movement also extends along the axis X.

During the operation of mounting the pump 1 on the neck 22 of the reservoir, a placing station is used at which the dispenser member (pump) is placed merely by gravity on the neck 22 of the reservoir. Naturally, it is desirable for the dispenser member to be placed completely axially in alignment with the axis X. However, it can frequently happen that the dispenser member is placed on the neck in manner that is offset or sloping relative to the axis X, as shown in the FIGS. 1 and 3. The axis of the dispenser member then forms an angle relative to the axis X. It can easily be understood that mounting the pump on the neck of the reservoir is not going to be easy, and may even cause the pump to be damaged or to be positioned inappropriately on the neck of the reservoir. Sealing and/or stable fastening may be affected.

The mounting head T of the present invention makes it possible not only to impart the axial mounting movement necessary to bring the pump 1 into its leaktight final mounted position on the neck, but also to bring or to return the pump 1 into its axial arrangement on the axis X, if it was placed on the neck in an offset or sloping manner at the placing station. FIGS. 1 and 3 show the situation in which the pump 1 is placed on the neck in manner that is greatly offset relative to the axis X, so as to illustrate the capacity of the mounting head of the invention to straighten up and to center the pump on the axis X.

The mounting head T of the invention comprises a mounting member 3 that includes a plurality of axial mounting tabs 31 that are arranged side-by-side and in a circle, so as to define an open cylinder constituted by tabs separated by axial slots. The number of mounting tabs 31 is advantageously greater than three, and may be thirty six, for example. The mounting tabs 31 are connected together at their top ends by a common fastener stub 39 for coming into engagement with axial mover means for providing downwards and upwards movement. In this way, the mounting member 3 is moved downwards then upwards along the axis X so as to come into engagement with the pump 1, so as to center it axially, and so as to move it axially into its leaktight final mounted position. Each mounting tab 31 comprises a main rod 32 that is connected at its top end to the common fastener stub 39 and that forms a contact appendage 33 at its bottom end, which comes into engagement with the pump 1. On its inside face, the contact appendage 33 defines an axial bearing profile 34 and a radial thrust wall 35. In the figures, it can be seen that the axial bearing profile 34 interrupts the radial thrust surface 35. Considering the mounting tabs 31 as a whole, it can be said that the axial bearing profiles 34 form a downwardly-directed annular shoulder. The radial thrust wall is in the form of two truncated cones that are offset at the annular shoulder formed by the axial bearing profile 34. It should be observed that the mounting member 3 is shown in the rest position in FIG. 2. The rods 32 of the mounting tabs 31 thus extend parallel to the axis X, whereas the radial thrust walls 35 are frustoconical. The contact appendage 33 also forms a notch 38 at its bottom end. Considering the mounting tabs 31 as a whole, the notches 38 co-operate with one another to form an annular groove. On its outside face, the contact appendage 33 forms an outer cam surface 36 that flares outwards and downwards, and that extends to form an outer frustoconical section 37.

The mounting head T also includes a clamping collar 4 that is arranged around the mounting tabs 31, and that may be moved axially along the axis X relative to the mounting member 3. The clamping collar 4 includes a bottom edge 41 and an inner wall 42, having functions that are given below. In its initial position, the clamping collar 4 is arranged around the mounting tabs 31 with the bottom edge 41 arranged at the base of the outer cam surface 36. The inner wall 42 is in contact or in direct proximity with the outside face of the stems 32. The mounting tabs 31 are in their rest position.

In FIGS. 1 and 3, the mounting head T has already been lowered axially in such a manner as to arrange the contact appendages 33 around the pump 1, without however coming into contact. The mounting head T is in its rest position, with the clamping collar 4 at the base of the outer cam surface 36. The mounting tabs 31 are still at rest, i.e. not stressed. The pump 1 has been placed unfortunately in sloping manner on the neck 22 of the reservoir 2. The first operation of the mounting head T of the invention is to straighten up and to center the pump 1 axially on the neck 22 along the axis X. To do this, the clamping collar 4 is moved axially downwards so that its inner edge 41 comes into bearing contact with the outer cam surface 36, so as to elastically deform the tabs 31 radially inwards. In this way, the radial thrust walls 35 come into contact with the pump 1 and push it in such a manner as to center it axially along the axis X, as can be seen in FIG. 4. In the centered final position, the inner wall 42 of the clamping collar 4 is in contact with the sector 37 of the contact appendage, arranged extending the outer cam surface 36. The pump 1 is now in an accurate axial arrangement, ready to be mounted in permanent manner on the neck 22 of the reservoir. To do this, the mounting member 3 is moved axially downwards so as to bring the axial bearing profile 34 into contact with the pump 1, and advantageously at the fastener ring 15. The axial descent of the mounting member 3 imparts an axial mounting movement to the pump 1 so as to snap-fasten it in leaktight manner on the neck 22, thereby compressing the neck gasket 16. The notches 38 formed in the ends of the contact appendages 33 make it possible to receive the skirt 26 of the cover 25. When the mounting member 3 is moved axially downwards, the clamping collar 4 may remain static, such that the sector 37 slides axially inside the inner wall 42 of the clamping collar 4. In a variant, provision could also be made for the clamping collar 4 to move together with the mounting member 3. It should be observed that in the position in which the mounting tabs 31 are stressed radially inwards, the thrust walls 35 and the sector 37 that were initially frustoconical are not arranged in completely cylindrical manner, whereas the rods 32 that were completely axial now slope inwards.

When the pump 1 is mounted permanently in leaktight manner on the neck 22 of the reservoir, the mounting head T may be removed so as to release the pump 1. This may be done be raising firstly the clamping collar 4 so as to allow the mounting tabs 31 to return to their rest position, then by raising the entire assembly.

The mounting head of the present invention thus makes it possible to return a dispenser member (pump or valve) into a completely axial arrangement from a sloping or offset position, then to bring the dispenser member into its leaktight final mounted position by imparting axial thrust thereto, possibly combined with turning. The general configuration of the mounting head T is similar to the configuration of a conventional crimping head, but the axial and radial movements of the mounting member perform functions that are different from the functions of a crimping head. Specifically, the radial clamping of the mounting tabs serves to straighten up the dispenser member, whereas the same movement in a crimping head makes it possible to deform the material. Furthermore, the axial movement makes it possible to mount the dispenser member on the neck in its leaktight final mounted position, whereas, in a crimping head, the axial movement does not have any function or action on the dispenser member.

The invention thus provides a single mounting head, having a known general design, but that makes it possible both to bring the dispenser member into an axial arrangement, and to move the dispenser member axially into its leaktight final mounted position.

The invention claimed is:

1. A mounting head for mounting a dispenser member on a neck of a fluid reservoir so as to constitute a fluid dispenser, the mounting head comprising a mounting member configured to impart an axial mounting movement to the dispenser member, which movement brings the dispenser member from an axial arrangement placed on the neck into a leaktight final mounted position on the neck, the mounting member incorporating axial centering means for bringing the dispenser member into an axial arrangement on the neck of the reservoir if the dispenser member has been placed in an offset manner on the neck;

the mounting head comprises a plurality of mounting tabs that are configured to be lowered axially so as to bring the dispenser member from the axial arrangement towards the final position, and that are movable radially inwards so as to return the dispenser member into an axial arrangement if the dispenser member has been placed in an offset manner on the neck, the mounting head further comprising an outer clamping collar for simultaneously moving the mounting tabs radially inwards from a spaced-apart rest position; and wherein each mounting tab includes an axial bearing profile configured to come into axial engagement with the dispenser member so as to move the dispenser member axially from the axial arrangement towards the final position, and a radial thrust wall that is suitable for thrusting the dispenser member into an axial arrangement if the dispenser member has been placed in an offset manner on the neck.

2. A mounting head according to claim 1, wherein each of the mounting tabs includes an outer cam surface that flares downwards and outwards, the outer clamping collar being axially movable downwards relative to the mounting tabs so as to come into engagement with the outer cam surfaces so as to clamp the mounting tabs.

3. A mounting head according to claim 1, wherein the mounting tabs are connected together at a common fastener stub.

4. A mounting head according to claim 1, wherein the mounting tabs are elastically deformable so as to be radially movable.

5. The mounting head according to claim 1, wherein the dispenser member is a pump or a valve.

6. The mounting head according to claim 1, wherein, in the rest position, the mounting tabs are in a free state and radially unstressed.

7. The mounting head according to claim 1, wherein the clamping collar is configured to axially slide over the mounting tabs in order to move the mounting tabs radially inwards from the spaced-apart rest position and correct an axial misalignment of the dispenser member.

8. A mounting head for mounting a dispenser member on a neck of a fluid reservoir so as to constitute a fluid dispenser, the mounting head comprising a mounting member configured to impart an axial mounting movement to the dispenser member, which movement brings the dispenser member from an axial arrangement placed on the neck into a leaktight final mounted position on the neck;

the mounting head comprises a plurality of mounting tabs that are configured to be lowered axially so as to bring the dispenser member from the axial arrangement towards the final position, and that are configured to move radially inwards so as to return the dispenser member into an axial arrangement when the dispenser member has been placed in an offset manner on the neck, the mounting head further comprising an outer clamping collar for sliding over the mounting tabs to move the mounting tabs radially inwards from a spaced-apart rest position; and wherein the clamping collar is dimensioned to move the mounting tabs from a free unstressed state to a stressed state in which the mounting tabs are displaced radially inwards so as to return the dispenser member into an axial arrangement when the dispenser member has been placed in an offset manner on the neck; and wherein each mounting tab comprises a rod portion that extends parallel to the axial mounting movement and an appendage at a lower distal end of the mounting tab, such that when the clamping collar moves axially downward around the appendage, the appendage is displaced radially inwards to return the dispenser member into the axial arrangement when the dispenser member has been placed in an offset manner on the neck, and when the tab is axially lowered, the appendage abuts an axially facing surface of the dispenser member and axially pushes the dispenser member in the final position.

* * * * *